No. 857,302. PATENTED JUNE 18, 1907.
A. G. QUINN.
END GATE.
APPLICATION FILED AUG. 30, 1906.

2 SHEETS—SHEET 1.

WITNESSES:
G. R. Thomas
James W. Zimm

INVENTOR
A. G. Quinn
BY
Attorneys

No. 857,302. PATENTED JUNE 18, 1907.
A. G. QUINN.
END GATE.
APPLICATION FILED AUG. 30, 1906.
2 SHEETS—SHEET 2.
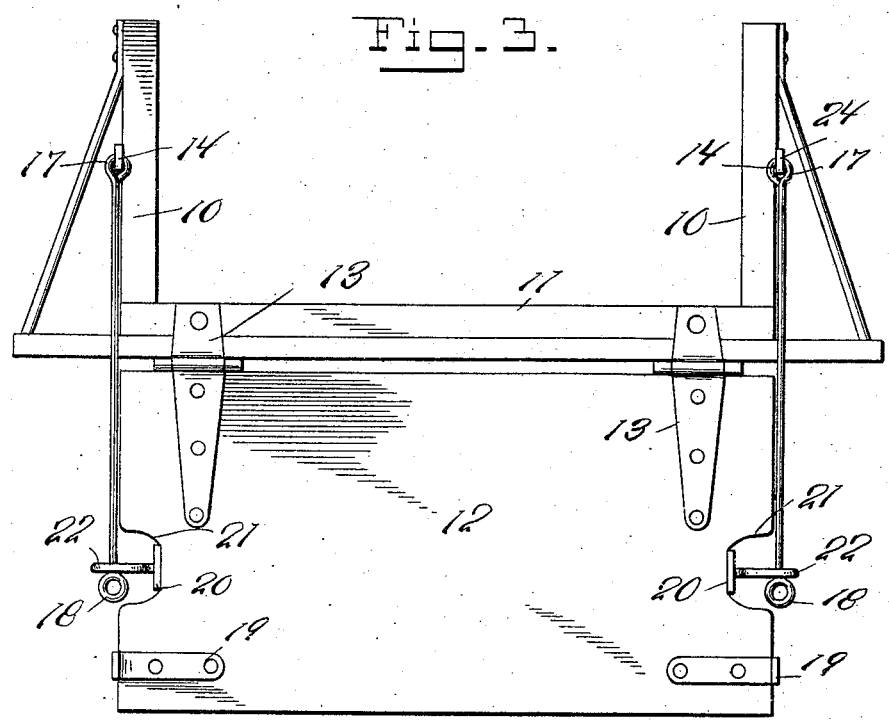
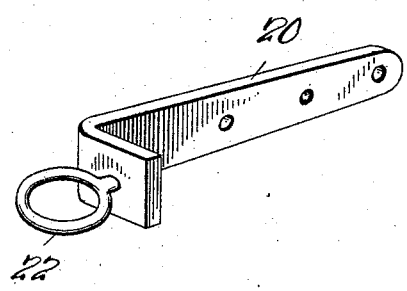
WITNESSES:
G. R. Thomas
James W. Quinn
INVENTOR
A. G. Quinn
BY
Attorneys

UNITED STATES PATENT OFFICE.

ALBERT G. QUINN, OF CLEVELAND, GEORGIA.

END-GATE.

No. 857,302.  Specification of Letters Patent.  Patented June 18, 1907.

Application filed August 30, 1906. Serial No. 332,681.

*To all whom it may concern:*

Be it known that I, ALBERT G. QUINN, a citizen of the United States, residing at Cleveland, in the county of White, State of Georgia, have invented certain new and useful Improvements in End-Gates; and I do hereby declare the following to be a full, clear, and exact description of the invention, such as will enable others skilled in the art to which it appertains to make and use the same.

This invention has relation to the end gates for wagons, and it has as its object the provision of improvements whereby the end gate may be readily operated to allow it to drop down out of the way in loading the wagon, as well as to be folded up in closed position and there securely held, though easily released when desired.

The invention is clearly shown as embodied in the wagon body portrayed in the annexed drawings forming a part of this specification, in view of which drawings the invention will first be described with respect to its construction and mode of operation, and then be pointed out in the subjoined claims.

Figure 1:
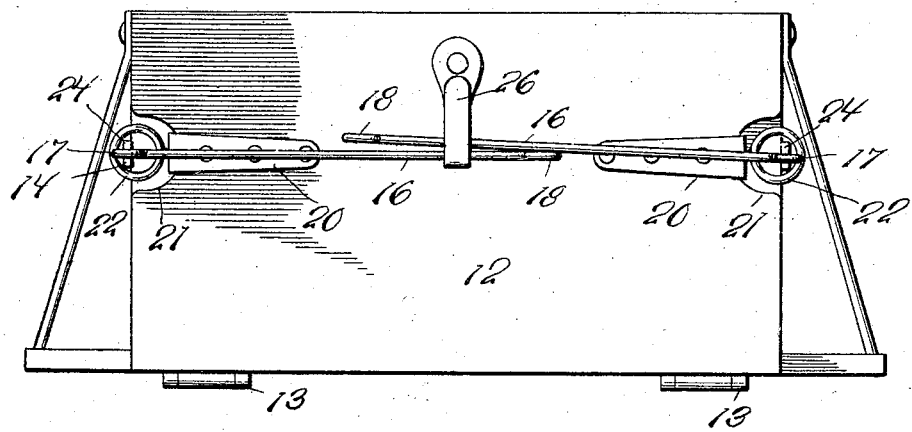
Figure 2:
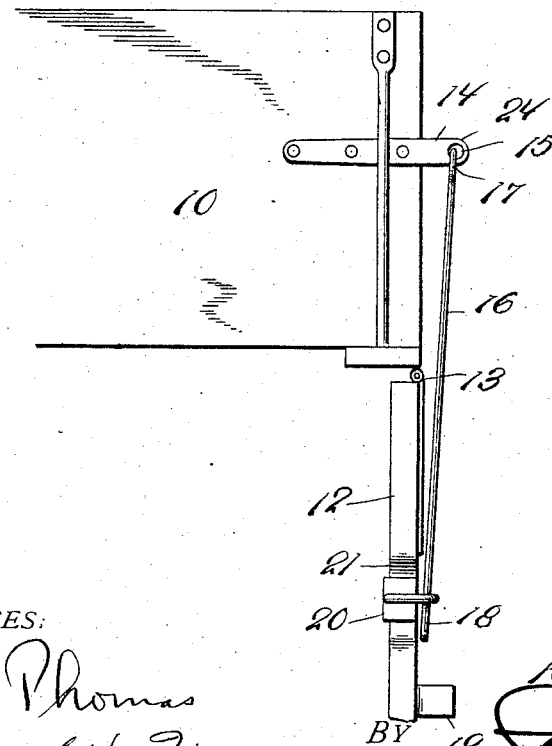

Of the said drawings, Figure 1 is a rear view of the end gate, representing it as closed. Fig. 2 is a side view of the same, showing the end gate open. Fig. 3 is a rear view of the wagon body showing the end gate open. Fig. 4 is a detail view of the connections on the end gate with the eye rods.

Similar figures of reference designate similar parts or features, as the case may be, wherever they occur.

In the drawings, 10 designates the sideboards of the wagon body, 11 the bottom of the bed, and 12 the end gate hinged to the bottom of the body by means of strap-hinges 13. The leaves of the hinges connected to the bottom of the bed are bent down at their outer ends and inset into the end of the bed bottom so as to bring the knuckle and pintle af the hinge just below the bed. This construction enables the end gate to be operated as hereinafter explained.

14 designates straps of metal, bolted or riveted to the outsides of the side-boards at the rearward end and extending beyond said end, the extension of each being provided with an eye 15. Rods 16, provided on each end with eyes 17 and 18, are adapted to operate in the eyes 15 and to have the eyes 17 engage or hook into the said eyes 15 when the end gate is fully open.

19 are straps of metal secured to the inside of the end gate on the end margins thereof, the outer ends of the said straps 19 being bent inward at a right angle to the body part so as to engage the outside of the ends of the side-boards when the end gate is closed to keep the sides of the wagon box from spreading.

Straps 20 are received against the outer face of the gate and have their end portions bent to extend into notches 21 formed in the ends of the gate. A ring or eye 22 is swiveled upon or connected with each strap 20 in a position so that the outer ends 24 of the straps 14 may extend through the ring 22 when the gate is closed.

The rods 16 are passed through the rings 22, the eyes 17 acting as stops, as stated, to prevent disengagement of the rods from the rings when the gate is fully open.

The closing of the end gate is effected by simply folding it up against the rear end of the wagon box in which case, owing to the construction and arrangement of the hinges, as hereinbefore described, the lower edge of the end gate will be brought flush with the bottom of the body or box. When the end gate is folded up, as explained, the free ends of the eye rods 16 will be folded against the back of the end gate, said free ends extending in opposite directions, and the said rods will be caught behind the hook 26 on the back of the end gate holding it securely in closed position. At the same time with the closing of the end gate, the angular ends of the straps 19 will engage the outside of the side-boards and so keep the same from spreading. As will be understood, the ends of the straps 14 extend through the rings 22 when the gate is closed.

What is claimed is:—

The combination with a wagon body having sides and a bottom, of an end gate hinged to the bottom for movement into and out of closed position and having notches in its ends, plates secured to one face of the gate and having end portions turned to extend into the notches, rings secured to the plates within the notches, straps secured to the outer faces of the sides and extending rearwardly therebeyond to project through the rings when the gate is in closed position, rods having eyes at their ends engaged each with an eye in one of the straps, said rods being slidably engaged in the rings, the other eyes of the rods being arranged to prevent disengagement of the rods from the rings, a hook secured to the outer face of the gate, said eye rods being foldable for engagement in the hook when the gate is in closed position to hold the gate against movement, and members carried by the gate and arranged to extend from the outer faces of the sides when the gate is in closed position.

In testimony whereof, I affix my signature, in presence of two witnesses.

ALBERT G. QUINN.

Witnesses:
R. T. KENIMER,
S. L. BROWN.